United States Patent
Six et al.

(10) Patent No.: US 6,898,678 B1
(45) Date of Patent: May 24, 2005

(54) SHARED MEMORY WITH PROGRAMMABLE SIZE

(75) Inventors: Laurent Six, Bar sur Loup (FR); Armelle Laine, Antibes (FR); Daniel Mazzocco, Le Rouret (FR); Gerald Ollivier, Vence (FR)

(73) Assignee: Texas Instrument Incorporated, Dallas, TX (US)

( * ) Notice: Subject to any disclaimer, the term of this patent is extended or adjusted under 35 U.S.C. 154(b) by 664 days.

(21) Appl. No.: 09/591,615

(22) Filed: Jun. 9, 2000

(30) Foreign Application Priority Data

Jun. 9, 1999 (EP) .............................. 99401388

(51) Int. Cl.$^7$ ............................... G09F 12/06
(52) U.S. Cl. ................. 711/151; 711/153; 711/158; 710/244; 710/107; 710/40
(58) Field of Search ................ 711/150–153, 158, 711/170, 147, 100, 115, 163; 710/22, 39, 40, 244, 107, 305; 709/217

(56) References Cited

U.S. PATENT DOCUMENTS

| | | | |
|---|---|---|---|
| 4,991,169 A | * | 2/1991 | Davis et al. ............... 370/463 |
| 5,218,686 A | * | 6/1993 | Thayer ........................ 711/100 |
| 5,375,216 A | * | 12/1994 | Moyer et al. ................ 711/123 |
| 5,598,575 A | * | 1/1997 | Dent et al. ..................... 710/28 |
| 5,638,530 A | * | 6/1997 | Pawate et al. .............. 711/115 |
| 5,659,688 A | | 8/1997 | Nimishakavi et al. ...... 710/113 |
| 5,815,167 A | * | 9/1998 | Muthal et al. ............... 345/541 |
| 5,838,934 A | * | 11/1998 | Boutaud et al. ............. 710/305 |
| 5,922,047 A | * | 7/1999 | Newlin et al. ............... 709/217 |
| 6,119,003 A | * | 9/2000 | Kukkohovi .................. 455/435 |
| 6,122,713 A | * | 9/2000 | Huang et al. ................ 711/147 |
| 6,138,010 A | * | 10/2000 | Rabe et al. ............... 455/426.1 |
| 6,202,130 B1 | * | 3/2001 | Scales et al. ................ 711/137 |

FOREIGN PATENT DOCUMENTS

| | | | |
|---|---|---|---|
| EP | 0 525 749 A1 | 7/1992 | ........... G06F/13/16 |
| EP | 0 548 550 A2 | 11/1992 | ........... G06F/15/16 |
| EP | 0 610 677 A2 | 1/1994 | ............. G06F/9/46 |
| EP | 0 657 853 A2 | 12/1994 | ........... G07B/17/02 |

\* cited by examiner

Primary Examiner—Pierre-Michel Bataille
(74) Attorney, Agent, or Firm—Robert D. Marshall, Jr.; W. James Brady, III; Frederick J. Telecky, Jr.

(57) ABSTRACT

A digital system is provided with a memory (42) that can be shared by two or more data requestors (10, 20). Two modes of access are provided. In a shared access memory (SAM) access mode, all of the data requestors can sequentially access the memory. In a host only memory (HOM) access mode, a portion (42a) of the memory is connected directly to one of the requestors, such as a host processor (10), so that high bandwidth transfers can be performed. A portion (42b) that is not selected to be in HOM mode can be accessed by other requestors or shut down to save power. The size (S1) of the portion of memory selected for HOM mode is selected to match the requirements of a given application and can be changed by writing a size value to a register.

11 Claims, 8 Drawing Sheets

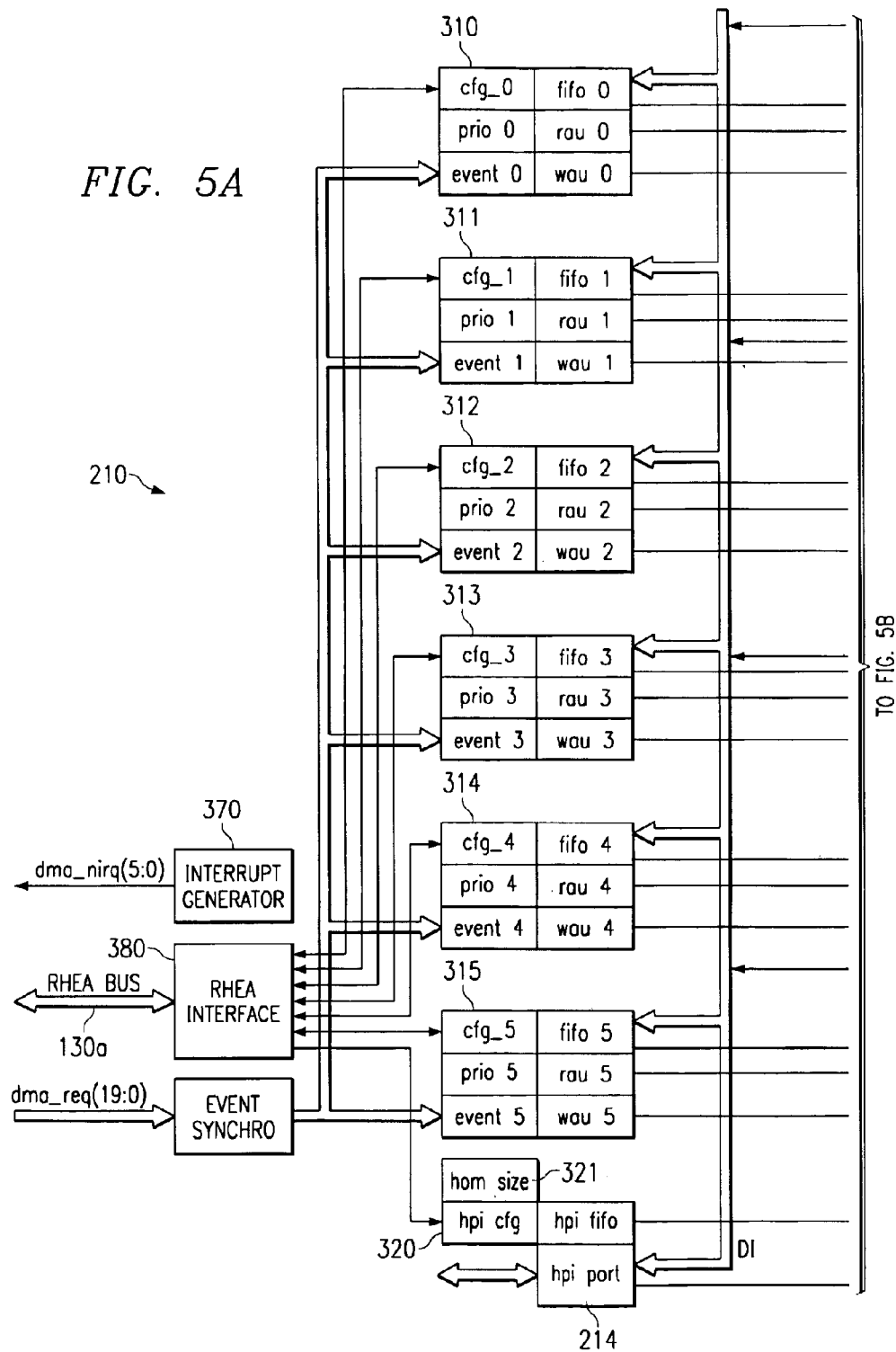

SHARED MEMORY WITH PROGRAMMABLE SIZE

CROSS REFERENCE TO RELATED APPLICATIONS

This application is related to co-assigned U.S. patent application Ser. Nos. 09/591,076; 09/591,623; and 09/591,535; co-filed contemporaneously herewith and incorporated herein by reference.

This application claims priority to S.N. 99401388.6, filed in Europe on Jun. 9, 1999 (TI-29030EU).

TECHNICAL FIELD OF THE INVENTION

This invention generally relates to microprocessors, and more specifically to improvements in shared access memory circuits, systems, and methods of making.

BACKGROUND OF THE INVENTION

Microprocessors are general purpose processors which provide high instruction throughputs in order to execute software running thereon, and can have a wide range of processing requirements depending on the particular software applications involved. A direct memory access (DMA) controller is often associated with a processor in order to take over the burden of transferring blocks of data from one memory or peripheral resource to another and to thereby improve the performance of the processor.

Many different types of processors are known, of which microprocessors are but one example. For example, Digital Signal Processors (DSPs) are widely used, in particular for specific applications, such as mobile processing applications. DSPs are typically configured to optimize the performance of the applications concerned and to achieve this they employ more specialized execution units and instruction sets. Particularly in applications such as mobile telecommunications, but not exclusively, it is desirable to provide ever increasing DSP performance while keeping power consumption as low as possible.

To further improve performance of a digital system, two or more processors can be interconnected. For example, a DSP may be interconnected with a general purpose processor in a digital system. The DSP performs numeric intensive signal processing algorithms while the general purpose processor manages overall control flow. The two processors communicate and transfer data for signal processing via shared memory.

SUMMARY OF THE INVENTION

Particular and preferred aspects of the invention are set out in the accompanying independent and dependent claims. Combinations of features from the dependent claims may be combined with features of the independent claims as appropriate and not merely as explicitly set out in the claims. The present invention is directed to improving the performance of processors, such as for example, but not exclusively, digital signal processors.

In accordance with a first aspect of the invention, there is provided a digital system having a memory circuit that can be accessed by several requestor circuits. A scheduling circuit is connected to the requester circuits and is operable to sequentially schedule memory accesses to the memory circuit. A selection circuit is connected to one of the requester circuits and to the output of the scheduling circuit. An access mode circuitry is provided for indicating at least a first access mode or a second access mode and is controllably connected to the selection circuit, such that all the requestor circuits can sequentially access the memory circuit when the access mode circuitry indicates the first access mode and one of requestor circuits has exclusive access to the memory circuit when the access mode circuitry indicates the second access mode. A size register for holding a size parameter is connected to the memory circuit. A first portion of the memory circuit is selected in response to the size parameter when the access mode circuitry indicates the second access mode, wherein only the first portion of the memory circuit is operable for exclusive access by the first requester when the access mode circuitry indicates the second access mode.

According to another aspect of the present invention, a second portion of the memory circuit not selected in response to the size parameter is operable to be in a low power mode when the access mode circuitry indicates the second access mode.

According to another aspect of the present invention, the selector circuit is operable to provide access by a second requestor to a second portion of the memory circuit not selected in response to the size parameter when the access mode circuitry indicates the second access mode.

In accordance with another aspect of the present invention, a method of operating a digital system having a memory circuit that is shared by a plurality of requestor circuits is provided. Shared access to the memory circuit between the plurality of requestor circuits is permitted when the digital system is in a first mode of operation. A first portion of the memory circuit is selected in response to a size parameter stored in a register, such that a second portion of the memory circuit is not selected. Access to the first portion of memory circuit is limited to only a first requestor of the plurality of requestors when the digital system is in a second mode of operation.

DESCRIPTION OF THE DRAWINGS

Particular embodiments in accordance with the invention will now be described, by way of example only, and with reference to the accompanying drawings in which like reference signs are used to denote like parts and in which the Figures relate to the digital system of FIG. 3, unless otherwise stated, and in which.

Corresponding numerals and symbols in the different figures and tables refer to corresponding parts unless otherwise indicated.

DETAILED DESCRIPTION OF THE INVENTION

Although the invention finds particular application to Digital Signal Processors (DSPs), implemented, for example, in an Application Specific Integrated Circuit (ASIC), it also finds application to other forms of processors. An ASIC may contain one or more megacells which each include custom designed functional circuits combined with pre-designed functional circuits provided by a design library.

Figure 1:
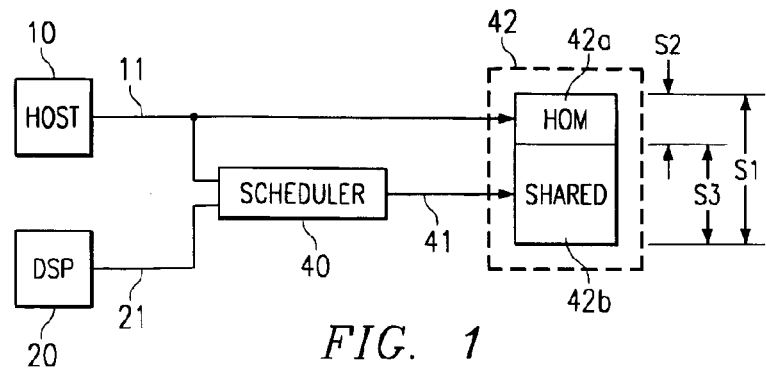
FIG. 1 is a block diagram of two processors sharing a block of memory, in which a portion of the block of memory can be designated as host only memory, according to an aspect of the present invention.

FIG. 1 is a block diagram of digital system 1 which has a host processor 10 and DSP 20 sharing a block of memory 42, in which a portion 42a of the block of memory can be designated as host only memory. A remaining portion 42b of the memory block is shared between the host processor and the DSP. A scheduling block 40 receives transfer requests from a memory access node in host processor 10 connected to bus 11 and transfer requests from a memory access node in DSP 20 connected to bus 21. Scheduler 40 interleaves these requests and presents them to the memory block; 42b via a request output node connected to bus 41. Accesses by the host processor can be in SAM mode (Shared access memory) or in HOM mode (Host only memory). An access by host 10 in HOM mode will bypass synchronization circuitry within scheduler 40 that synchronizes timing to DSP timing. Host only memory 42a is accessed directly in HOM mode by bus 11 in a manner that bypasses scheduler 40. These accesses are faster since a scheduling delay is not incurred.

Memory block 42 has a total size S1. Host only memory 42a has a size S2 that is selected for a particular application, for example. Shared memory portion 42b has a size S3 that is equal to S1 minus S2. For a different application that is performed on digital system 10, it is desirable to have size S1 be different. According to an aspect of the present invention, size S1 can be changed under control of host processor 110.

Figure 2:
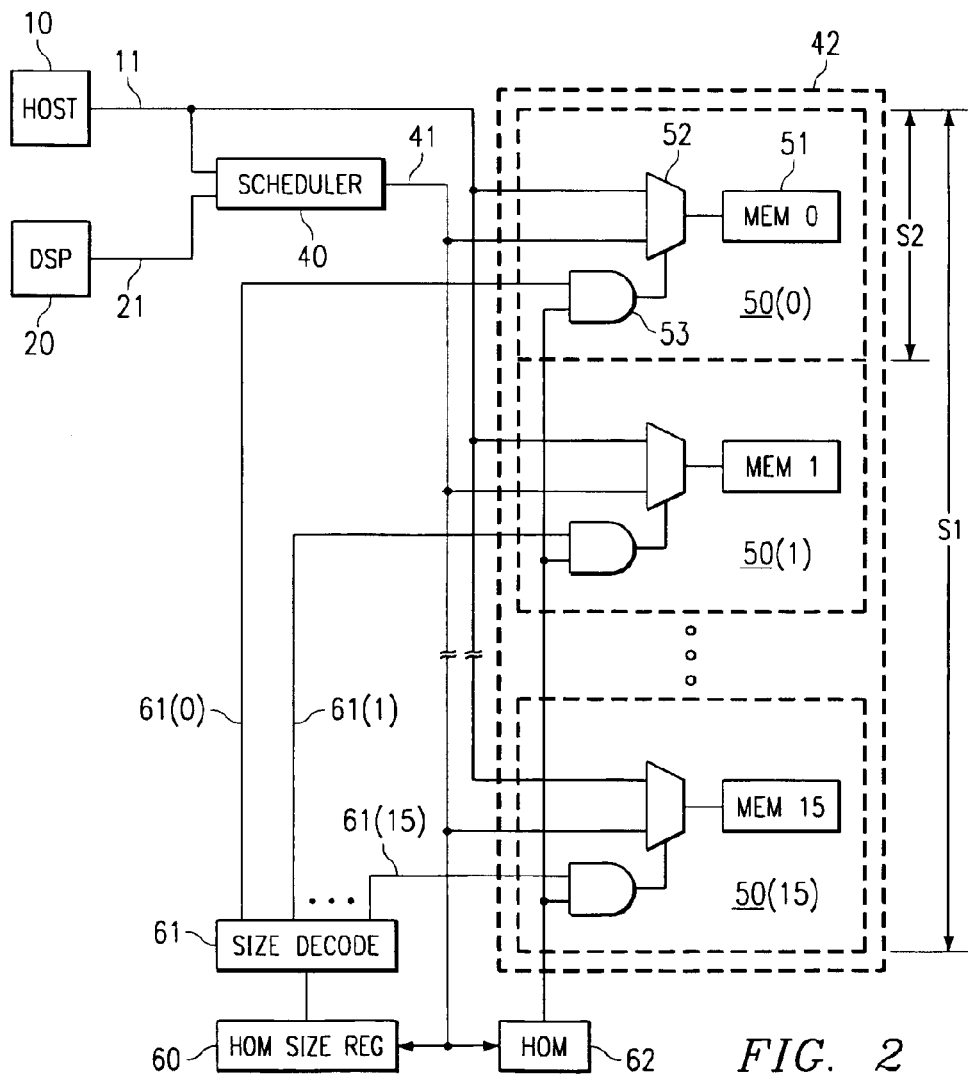
FIG. 2 is a block diagram of the digital system of FIG. 1 showing the memory block of FIG. 1 in more detail.

FIG. 2 is a block diagram of digital system 1 showing the memory block of FIG. 1 in more detail. In the present embodiment, size S1 is 128k×16 words. Sixteen memory banks 50(0)–50(15) are each 8k×16. Size S2 can be selected to be any multiple of 8k×16 by writing a size value in size register 60. Size decoder 61 produces sixteen individual HOM size enable lines 61(0)–61(15) that are connected to each respective memory bank. Table 1 lists the HOM size values that may be stored in size register 60 and the resulting HOM size enable signals and allocation of HOM and SAM memory sizes. A HOM mode controller 62 is responsive to a directive written via bus 41 to be in either HOM mode or to switch to SAM mode. Note in Table 1 that when HOM mode is "0", i.e., in SAM mode, that the HOM size value is ignored and the entire memory block is in SAM mode.

TABLE 1

HOM Size Enable Signals

| HOM mode | HOM size value | HOM size enable signals | Allocation of HOM and SAM |
|---|---|---|---|
| 0 | xxxx | 0000000000000000 | 128K × 16 SAM memory |
| 1 | 0000 | 0000000000000001 | 8K × 16 HOM memory |
| 1 | 0001 | 0000000000000011 | 16K × 16 HOM memory |
| 1 | 0010 | 0000000000000111 | 24K × 16 HOM memory |
| 1 | 0011 | 0000000000001111 | 32K × 16 HOM memory |
| 1 | 0100 | 0000000000011111 | 40K × 16 HOM memory |
| 1 | 0101 | 0000000000111111 | 48K × 16 HOM memory |
| 1 | 0110 | 0000000001111111 | 56K × 16 HOM memory |
| 1 | 0111 | 0000000011111111 | 64K × 16 HOM memory |
| 1 | 1000 | 0000000111111111 | 72K × 16 HOM memory |
| 1 | 1001 | 0000001111111111 | 80K × 16 HOM memory |
| 1 | 1010 | 0000011111111111 | 88K × 16 HOM memory |
| 1 | 1011 | 0000111111111111 | 96K × 16 HOM memory |
| 1 | 1100 | 0001111111111111 | 104K × 16 HOM memory |
| 1 | 1101 | 0011111111111111 | 112K × 16 HOM memory |
| 1 | 1110 | 0111111111111111 | 120K × 16 HOM memory |
| 1 | 1111 | 1111111111111111 | 128K × 16 HOM memory |

Still referring to FIG. 2, each memory bank 50(n) has a multiplexor 52 that receives bus 11 on one input and bus 41 on a second input. Mux control circuit 53 provides a control signal to select bus 11 when the HOM bit is asserted and a respective HOM size enable signal is asserted. Otherwise, mux 52 selects bus 41. An output node of each mux provides the selected request signal, including address and data, to the associated memory bank.

While HOM mode is asserted, requests by DSP 20 can still be serviced by the memory banks that are allocated as SAM. In an alternative embodiment, memory banks that are not enabled in response to the size parameter in HOM mode can be placed in a low power state, by using a gated clock circuit to turn of the clock to the memory bank, for example.

Figure 3:
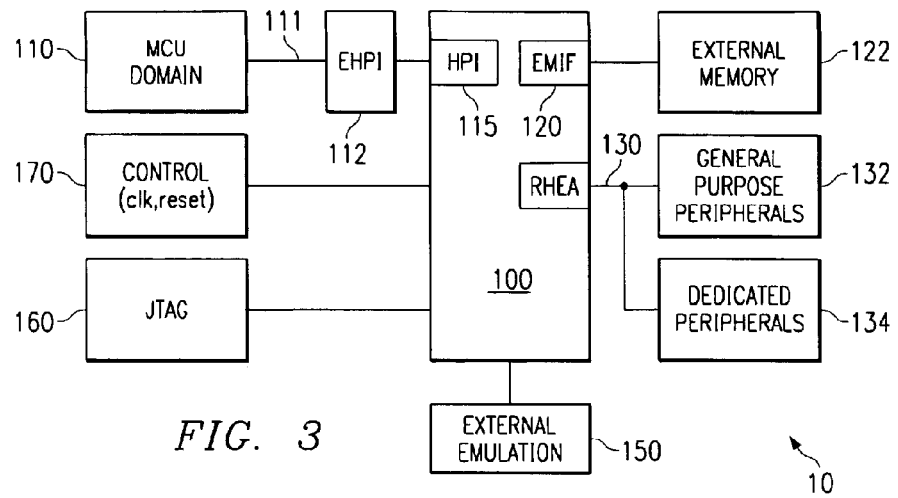
FIG. 3 is a block diagram of another digital system that includes an embodiment of the present invention.

FIG. 3 is a block diagram of another digital system that includes an embodiment of the present invention. Megacell 100 includes a CPU, DMA controller and memory circuits, and will be described in greater detail later. Host processor 110 is connected to megacell 100 via enhanced host port interface (EHPI) 112. EHPI 112 provides multiplexing of the host address and data bus 111 to match the host port interface 115 provided by megacell 100. Memory 122, general purpose peripherals 132 and dedicated peripherals 134 can be accessed by host processor 110 or the CPU within megacell 100. Control circuitry 170 provides timing signals for circuitry within megacell 100. MCU 110 includes its own timing circuitry, which requires that accesses by MCU 110 to resources controlled by megacell 100 must be synchronized to the time base of megacell 100.

JTAG test port 160 contains hardware extensions for advanced debugging features. These assist in the user's development of the application system (software and the hardware) utilizing only the JTAG interface, a test access port and boundary-scan architecture defined by the IEEE 1149.1 standard with extended operating mode enhancements, as described in U.S. Pat. No. 5,828,824. Emulation circuitry 150 provides debug program control and execution tracing facilities.

Figure 4:
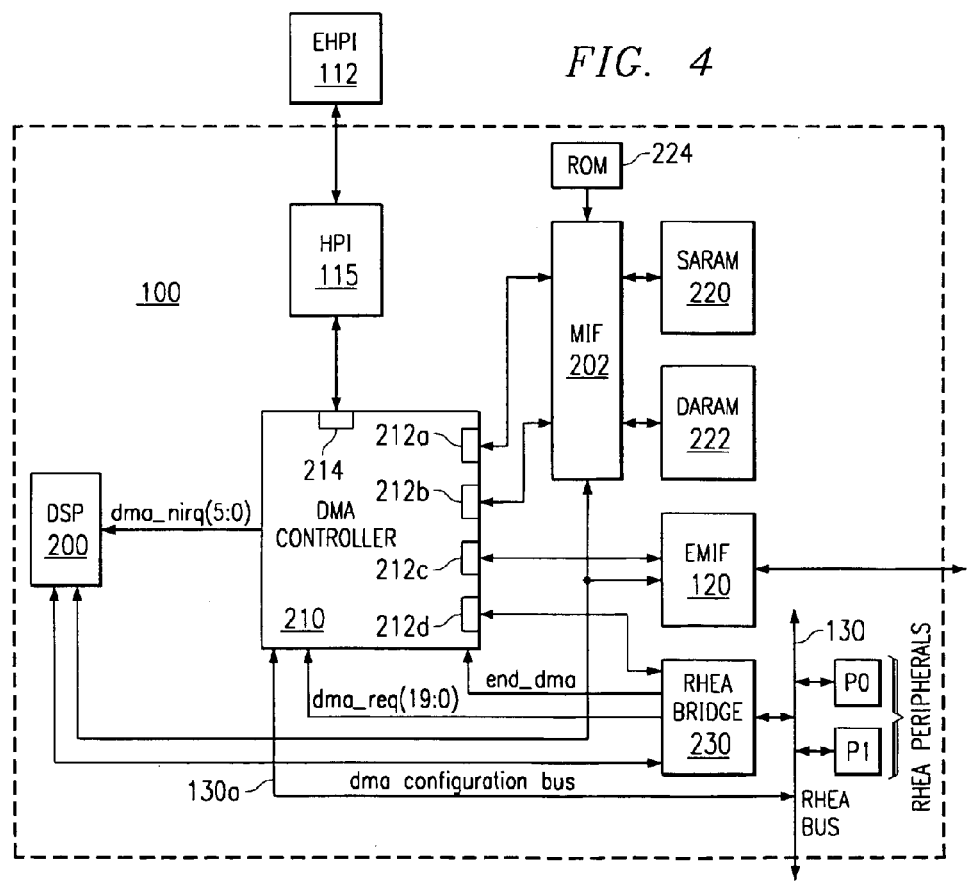
FIG. 4 is a more detailed block diagram of a megacell from FIG. 3.

FIG. 4 is a more detailed block diagram of megacell 100. CPU 200 is a digital signal processor (DSP). CPU 200 access memory circuits 220, 222 and 224 and EMIF 120 via memory interface circuitry 202. CPU 200 access other resources via RHEA bridge 230 to RHEA bus 130. DMA controller 210 is a multi-channel DMA controller with separate channel and port controllers with each port having local scheduling circuitry. DMA 210 can be programmed to transfer data between various sources and destinations within digital system 10, such as single access RAM 220, dual access RAM 222, external memory 122 via external memory interface 120, and peripheral devices on resource bus (RHEA) 130 via RHEA bridge 230. MCU 110 can also access these resources via host port interface (HPI) 115 which is connected to DMA controller 210. The path between the HPI port and the Memory is a DMA channel.

Memory circuit 220 is a 128K×16 Single Access RAM (SARAM), comprising sixteen 32K byte modules. DMA 210 can access the SARAM by a 16 bit DMA bus. The DMA bus access (R/W) can be in SAM (Shared access mode) or in HOM mode (Host only mode). An access by MCU 110 in HOM mode will bypass synchronization circuitry within DMA 210 that synchronizes MCU timing to megacell 100 timing. According to an aspect of the present invention, a HOM size register is provided so that the size of the HOM memory can be specified by the host processor.

The priority scheme between CPU 200 and DMA 210 is programmable. The priority circuitry is implemented in the SARAM, whereas the control register is located in the DMA 10 space accessible via RHEA bus branch 130a.

Memory circuit 222 is a 32K×16 Dual Access RAM (DARAM) comprising four 16K byte modules. CPU 200 can perform two accesses to one DARAM memory module in one cycle; for example, a single read and single write, or a long read and a long write, a dual read and a single write etc. The priorities assigned to the different accesses are handled by the DARAM. The priority scheme between CPU and DMA is programmable. The priority circuitry is implemented in the DARAM, whereas the control register is located in the DMA IO space accessible via the RHEA bus.

Another embodiment of the present invention may have different configurations of memory and peripherals.

FIG. 4 only shows those portions of megacell 100 that are relevant to an understanding of an embodiment of the present invention. Details of general construction for DSPs are well known, and may be found readily elsewhere. For example, U.S. Pat. No. 5,072,418 issued to Frederick Boutaud, et al, describes a DSP in detail and is incorporated herein by reference. U.S. Pat. No. 5,329,471 issued to Gary Swoboda, et al, describes in detail how to test and emulate a DSP and is incorporated herein by reference. Details of portions of DMA controller 210 relevant to an embodiment of the present invention are explained in sufficient detail hereinbelow, so as to enable one of ordinary skill in the microprocessor art to make and use the invention.

Table 2 summarizes several of the acronyms used throughout this document.

TABLE 2

Glossary of Terms

| DMA | Direct Memory Access |
| MIF | Memory Interface |
| EMIF | External Memory Interface |
| HPI | Host Port Interface |
| RHEA | Resource access bus, for peripheral devices and memory mapped register access |
| SARAM | Single Access RAM |
| DARAM | Dual Access RAM |
| PDROM | Program and Data ROM |
| HOM_M | Host Only Mode Memory |
| SAM_M | Share Access Mode Memory |
| HOM_R | Host Only Mode RHEA |
| SAM_R | Share Access Mode RHEA |

TABLE 2-continued

Glossary of Terms

| DSP | Digital Signal Processor |
| CPU | a microprocessor within a megacell on an integrated circuit (IC), such as a DSP. |
| MCU | a second processor that interacts with the CPU, may act as a master, or host, processor |
| EHPI | Enhanced Host Port Interface. |
| Element | the atomic unit of data transferred by the DMA. An element can be a word, 2 words, a burst of 4 words, or a burst of 8 words. |
| Frame | set of elements. |
| FIFO | first in, first out buffer |

DMA controller 210 transfers data between points in the memory space without intervention by the CPU. The DMA allows movements of data to and from internal memory, external memory and peripherals to occur in background of CPU operation. The DMA has six independent programmable channels allowing six different contexts for DMA operation, executed in Time Division Multiplexed (TDM) mode.

The DMA architecture is organized around ports and channels. Referring still to FIG. 4, each resource the DMA can access has its own port: SARAM port 212a, DARAM port 212b, EMIF port 212c, and RHEA port 212d. HPI port 214 is a special case, which will be discussed later. A port can make read and write accesses to the resource to which it is connected, through a dedicated bus.

This DMA controller meets the need of high rate flow and multi-channel applications such as wireless telephone base stations or cellular handset data traffic.

Figure 5B:
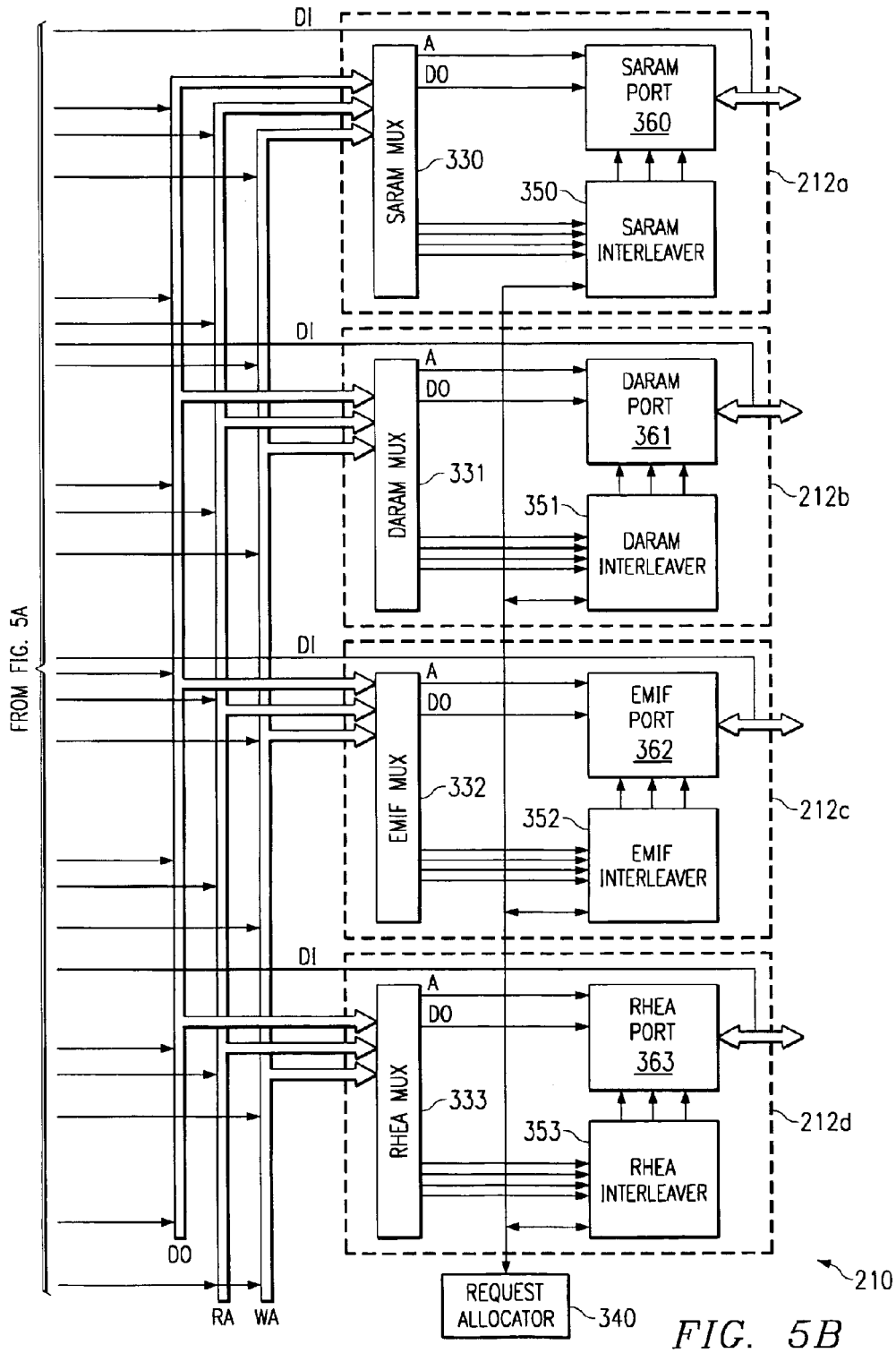
FIG. 5 is a detailed block diagram of the DMA controller of FIG. 4.

FIG. 5 is a detailed block diagram of the DMA controller of FIG. 4. A channel is made of a source port, a FIFO and a destination port. Six channels are available in the present embodiment, although other embodiments may have alternate numbers of channels. Six channel controllers 310–315 control the six channels. All six channels are multiplexed on each port via respective port multiplexers 330–333. Each channel control has a respective FIFO(n). The FIFOs aren't shared by the channels; each channel has its own FIFO. This allows more independence between transfers. A DMA transfer in channel (n) is made in two steps: the source port performs a read access on a source resource, gets the data and puts it in the channel (n) FIFO; once the data is in the FIFO, the destination port is activated and performs a write access to the destination resource to write the data. Each channel controller includes a separate read address unit RAU(0–5) and a separate write address unit WAU(0–5).

All of the ports operate in parallel. In this embodiment, there are four ports connected the four data storage resources, therefore, four concurrent read/write accesses can be made on the same clock cycle. In order to support this access rate, the address computation and the interleaving are pipelined. Maximum transfer rate for this embodiment with four ports is two words (two reads and two writes) per CPU cycle. This is achieved when sources and destinations are independent. An alternate embodiment may have a larger number of ports with a correspondingly higher maximum transfer rate.

A read address bus RA includes seven individual buses for conveying a channel read address from each read address unit RAU(0–5) and from the HPI port to each port input mux 330–333 in parallel. A write address bus WA includes seven individual buses for conveying a channel write address from each write address unit WAU(0–5) and from the HPI port to each port input mux 330–333 in parallel. Likewise, a data output bus DO includes seven individual buses for conveying a data output value from each FIFO(0–5) and from the HPI port to each port input mux 330–333 in parallel. A data input bus DI includes four individual buses for conveying a data input value from each port to each FIFO(0–5) and to the HPI port in parallel.

A DMA port sends a request to its associated memory to read or write a data item in this memory. A transfer of one word consists of a read request on a source port i following by a write request on destination port j (i can be equal to j). A request is defined by its type (r for read, w for write) and the channel it belongs to.

| example: | $r_i$ is a read request in channel i |
|---|---|
| | $w_j$ is a write request in channel j |

Each port has its own interleaver 350–353 to control the channel multiplexing on the associated port. The interleaver receives read and write requests from each channel, computes which is the next request that must be served, and triggers a port control state machine to serve this request.

DMA controller 210 has a request allocator 340. There can be up to thirteen requests pending on any given clock cycle: six read requests, six write requests, and an HPI request. In order to reduce interleaver complexity, an interleaver in the present embodiment can interleave a maximum of five simultaneous requests at the same time. Request allocator 340 scans the DMA configuration and pending requests signals and selects a maximum of five request signals to send to each interleaver for processing. In an alternate embodiment, the allocator may be divided into separate portions such that each port has allocator circuitry included within the port. In another embodiment, a more complex interleaver may directly receive and schedule all requests provided by all of the channels.

Each port has an associated port control block 360–363. These blocks are responsible for initiating the read/write accesses to the memories and peripherals. They implement the transaction access protocol between the memories or peripherals and the DMA. These protocols are the same for SARAM and DARAM. The RHEA bus protocol and the EMIF protocol are different. Thus, each port is tailored to the type of resource to which it is connected.

Each channel controller has an associated priority block PRIO(0–5). The function of this block is to implement a three level priority scheme available in the DMA: high priority for HPI, high priority for channels, low priority for channels.

Each channel controller has an associated event synchronization block EVENT(0–5). Each event synchronization block waits for events that trigger a transfer in its channel. Each block also looks for event drops.

Channel FIFOs each have eight stages in this embodiment. FIFO receive the data communicated from a source port to a destination port. They allow the pipelining of DMA transfers and the bursting to/from external memories. Bursts of eight data words are possible in all channels.

Interrupt generator 370 generates interrupts to the CPU according to the DMA configuration and state. Each channel has its own associated interrupt signal, dma_nirq(5-0).

RHEA interface 380 interfaces RHEA bus 130a from the RHEA bridge. RHEA interface 380 is used only for CPU reads and writes in the DMA configuration registers. DMA accesses to RHEA peripherals are made through the RHEA port, not through the RHEA interface.

Descriptor blocks CFG(0–5) are used to control and monitor the status of the DMA transfers. There is one descriptor block per channel. They are read/written via RHEA interface 380. Descriptor block 320 is used to control and monitor the status of host processor transfers. HOM size register 321 can be loaded with a size value to specify a portion of SARAM 220 that will be treated as HOM memory.

HPI port 214 allows direct transfers between the HOST and the memory. This path supports HOM and SAM mode. In HOM mode, the DMA Registers are by-passed. Switching from SAM to HOM requires the DMA HOST channel to be empty before switching.

HPI Port

Figure 6:
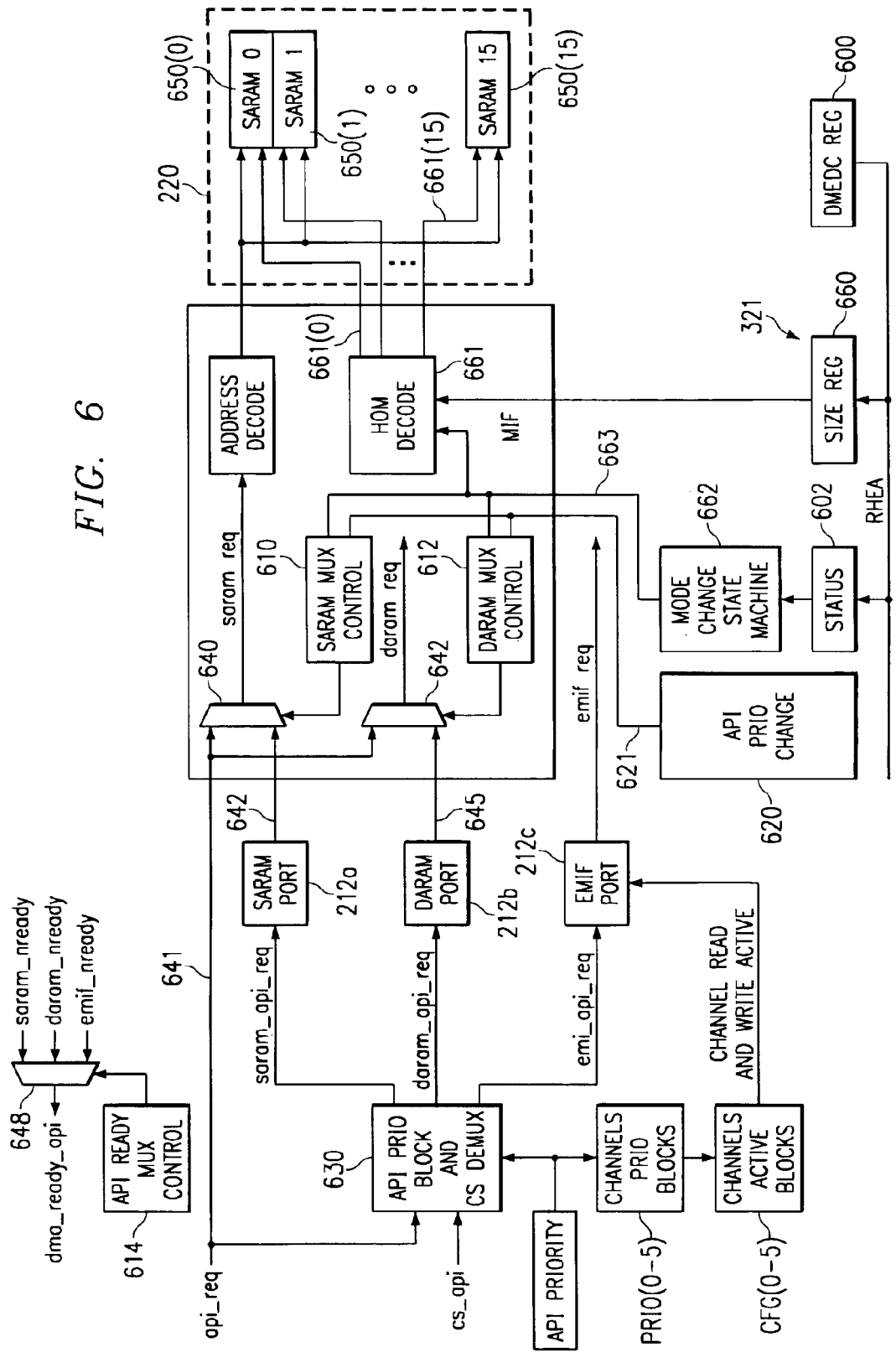
FIG. 6 is a block diagram showing portions of the host port interface of the DMA controller.

The HPI port will now be described in more detail. FIG. 6 is a block diagram showing portions of the host port interface of DMA controller 210. Table 3 summarizes the HPI different modes of operation. In HOM mode, the DMA is totally bypassed when the HPI performs an access to SARAM. Therefore, during HOM mode, portions or all of the DMA controller and CPU 200 can be placed in a low power state without affecting transfers by the host processor. When in SAM mode and the HPI has priority over the DMA channels the DMA is totally bypassed when HPI accesses SARAM or DARAM. This allows a transfer bandwidth of up 20 Mwords/s from MCU to internal memory. When the HPI has the same priority as the DMA channels, all HPI requests are processed through the DMA.

TABLE 3

HPI Modes of Operation

| DMA mode | HPI priority | HPI access | HPI request processing |
|---|---|---|---|
| HOM | no matter | SARAM only | DMA is bypassed |
| SAM | high | SARAM | DMA is bypassed |
| | | DARAM | |
| | | EMIF | through the DMA |
| | same as channels | SARAM | through the DMA |
| | | DARAM | |
| | | EMIF | |

A DMA Enable/Disable Control Register (DMEDC) 600 is a 16-bit read/write register accessed via the RHEA bus. It contains the DMA transfer priority and transfer enable control for each DMA channel. A DMA Enable/Disable Control Bit (DE[5:0]) field specifies the DMA enable/disable control for each channel (0=disabled, 1=enabled). The DE[5:0] fields are set to zero upon reset.

A Channel priority PRIO[5:0] field defines the priority of each channel: PRIO[i]=0 indicates channel i has a low priority; PRIO[i]=1 indicates channel i has a high priority. An HPI priority HPI[1:0] field defines the priority of the host port in relation to the DMA channels. When HPI[1:0]=10 or 11, the HPI has the HIGHEST priority versus all DMA Channels, and can access on-chip RAM only. Other DMA channels cannot access on-chip RAM. When HPI[1:0]=01, the HPI is sequenced into the DMA channel Time Division Multiplex (TDM) access flow and is treated as a HIGH priority channel. When HPI[1:0]=00, the HPI is integrated in the DMA channel TDM flow and is treated as a LOW priority channel. HPI[1:0]=11 upon reset.

Transfers of all channels are Time Division Multiplexed in a round-robin fashion. In a given round-robin queue, each channel is switched to the next channel after its read has been triggered. The low priority channels will be pending as long as high priority channels need to be triggered. Low priority channels are triggered in a round-robin fashion when event synchronized high priority channels are waiting for events and non synchronized high priority channels are completed.

Still referring to DMEDC register 600, a CPU/DMA bus priority bit specifies the priority of CPU 200 with respect to DMA controller 210 when both access the same memory resource. When CPU/DMA=1, CPU 200 busses have priority over DMA 210 busses for all internal and external memory accesses. When CPU/DMA=0, DMA 210 busses have priority over CPU 200 busses for all internal and external memory accesses.

When HPI has the high priority (HPI[1:0]=10 or 11), it has exclusive access to SARAM and DARAM. All the DMA channels involving SARAM or DARAM are stopped. Other DMA channels can continue operation.

In HOM mode, transfers to and from the MCU are made through the HPI only. The DMA is bypassed. Only an area in SARAM specified by HOM size register 321 can be source/destination of an HPI transfer in HOM mode, and: SARAM access protocol is directly driven by HPI. In the present embodiment, SARAM 220 is 128k×16 bit words. Sixteen memory banks 650(0)–650(15) are each 8k×16. A size for a HOM memory portion can be selected to be any multiple of 8k×16 by writing a size value into size register 321. Size decoder 661 produces sixteen individual HOM size enable lines 661(0)–661(15) that are connected to each respective memory bank. Thus, a memory bank that is not selected to be in the HOM portion can be placed in a low power state. Gated clock circuits (not shown) associated with each memory bank detect when a bank is not selected and stop the clock to that bank to reduce power consumption.

Transfers by the DMA that do not require access to SARAM 220 can go on while the DMA is in HOM mode, if the DMA isn't idled.

Figure 7A:
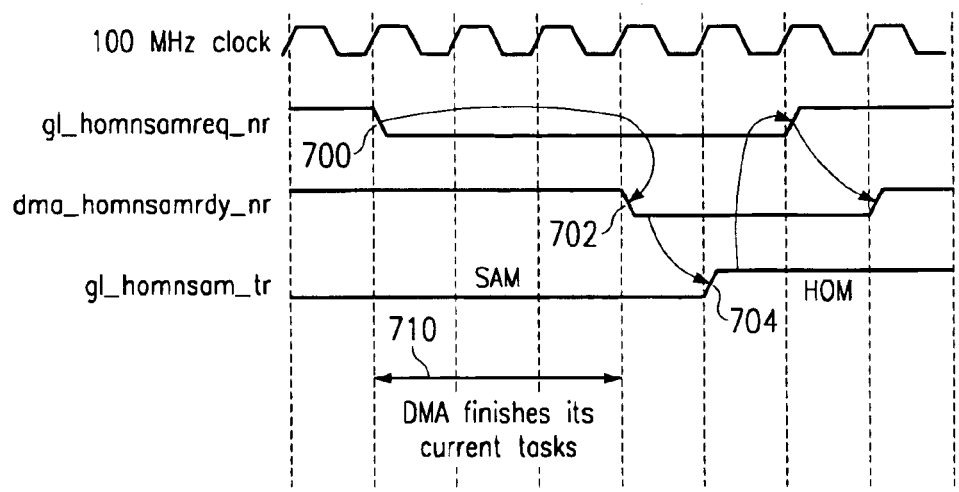
FIG. 7A is a timing diagram illustrating a transition from SAM mode to HOM mode.

FIG. 7A is a timing diagram illustrating a transition from SAM mode to HOM mode that takes place under control of mode change state machine 662. A transition is requested by setting a HOM mode bit in a status register 602 that is memory mapped on the RHEA bus and asserts a HOM to SAM request signal gl_homnsamreq_nr indicated at 700. Before entering HOM mode, the DMA must finish all its current channel accesses on the SARAM port and stop all the channels that require access to the SARAM area, indicated by delay period 710. This is done by comparing the source and destination of all the channels. If equal to SARAM, the relevant active bits are invalidated, stopping the channel by an interleaver stall. When all SARAM transfers are ended, a ready signal dma_homnsamrdy_nr is asserted at 702. On the next clock, HOM mode signal 663 (gl_homnsam_tr) is asserted at 704 and sent to SARAM mux control block 610, DARAM mux control block 612 and HOM decoder block 661. After transitioning to HOM mode, the DMA controller and/or CPU 200 can be idled to save power.

Figure 7B:
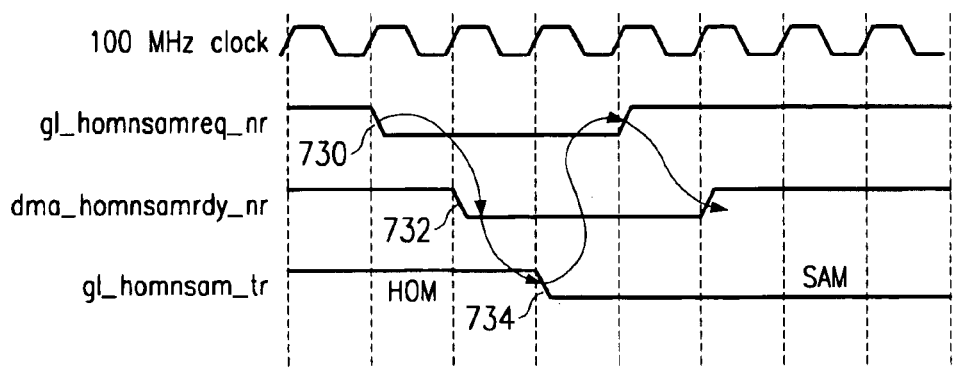
FIG. 7B is a timing diagram illustrating a transition from HOM mode to SAM mode.

FIG. 7B is a timing diagram illustrating a transition from HOM mode to SAM mode. The DMA must have a clock (i.e must have exited from idle mode) before a HOM to SAM transition is performed. All HPI HOM accesses are finished when the HPI requests a HOM to SAM transition. The request for mode change is made by resetting the HOM mode bit in the status register which causes request signal gl_homnsamreq_nr to be asserted at 730. The DMA has no operations on the SARAM port because of being in HOM mode, therefore the ready signal dma_homnsamrdy_nr is asserted on the next clock at 732. Mode signal 663 (gl_homnsam_tr) is transitioned low at 734 by HOM state machine 662.

Referring again to FIG. 6, HPI priority change block 620 generates signal HPI_direct_access 621 in response to the state of HPI priority HPI[1:0] bits in DMEDC register 600. Signal 621 is used in HPI mux control logic blocks 610, 612 and 614 to enable/disable HPI direct access to SARAM and DARAM according to HPI priority. This signal must change only when all the channels accessing SARAM and DARAM are halted and when there is no more requests are pending on SARAM and DARAM port, to prevent HPI accesses interfering with DMA accesses. Ready signals (not shown) are provided by the ports to indicate when a priority change can be performed by block 620.

HPI priority block and chip select demultiplexer block 630 implements the HPI two priority levels (low, high) when HPI priority is equal to priority of the DMA channels and send the HPI requests (saram_api_req, daram_api_req, and emi_api_req) to the target ports 212a–c in response to the HPI chip select signal cs_HPI.

HPI SARAM multiplexers 640 select either address/data signals 641 directly from host port interface 115 or address/data signals 642 from SARAM port 212a to provide to SARAM 220 in response to a select signal provided by SARAM mux control block 610. The data out bus from SARAM is directly connected to the DMA HPI data out bus. The acknowledge signal from SARAM is muxed with other memory acknowledges by ready mux 648.

HPI DARAM multiplexers 644 select either address/data signals 641 directly from host port interface 115 or address/data signals 645 from DARAM port 212b to provide to DARAM 222 in response to a select signal provided by DARAM mux control block 612. The data out bus from DARAM is directly connected to the DMA HPI data out bus. The acknowledge signal from DARAM is muxed with other memory acknowledges by ready mux 648.

Saram

Host accesses to the SARAM are made using HPI interface 115 via HPI port 214 and a DMA channel. As described above, two access modes are possible. In shared access mode (SAM) both the MCU and the DSP may access the SARAM. All accesses are synchronous to the dsp clock and the priority is controlled by DMEDC configuration register 600. In host only mode (HOM), only the MCU can access the SARAM and all accesses are asynchronous to the clock. In this case, the DMA channel is bypassed.

Figure 8:
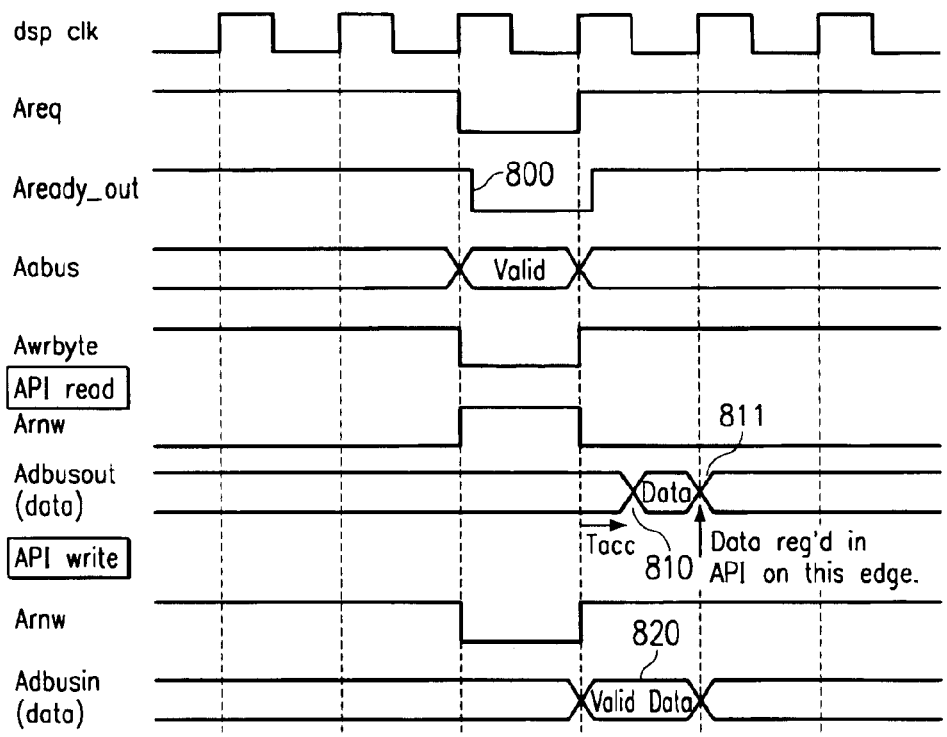
FIG. 8 is a timing diagram illustrating a memory access in SAM mode.

FIG. 8 is a timing diagram illustrating an SARAM memory access in SAM mode. The Figure shows the timing for both a SAM mode read and a SAM mode write. In SAM mode, all requests are made synchronously to DSP clock signal dsp_clk provided by clock circuitry in control block 170. A request is made by the HPI driving the request signal Areq low. Signal Areq is responsive to the HPI request signal saram_api req. The address signals Aabus, read/write signal rnw, byte signals Awrbyte etc. are also driven in the same clock cycle. As soon as the request is granted by the arbitration logic, the Aready_out signal is driven active (low) as shown at 800.

For a SAM read, the data is driven on data output bus Adbusout by the SARAM in the second cycle on the low phase of dsp clk as indicated at 810. The data is received and latched in the HPI on the following rising edge of dsp_clk at 811.

For a write, the data must be driven by the HPI on the data input bus Adbusin in the second cycle as shown at 820.

Figure 9:
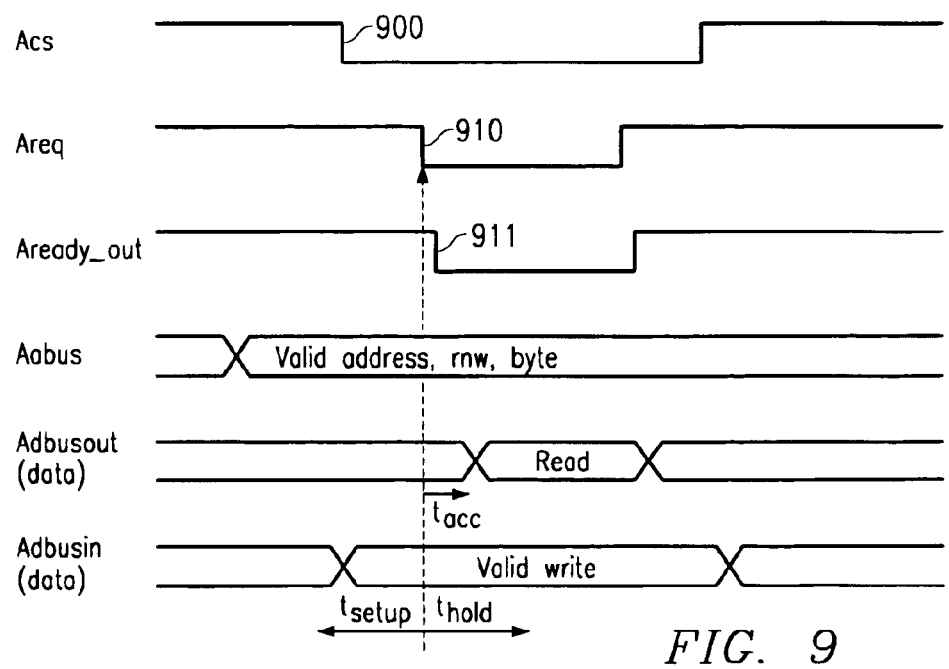
FIG. 9 is a timing diagram illustrating a memory access in HOM mode.

FIG. 9 is a timing diagram illustrating a memory access in HOM mode. As discussed above, in HOM mode, the DMA is bypassed. Therefore, HOM mode makes a direct link between HPI interface and SARAM HPI/DMA port and memory accesses are performed in an asynchronous manner without regard to the clock signal used by DSP 200 and DMA 210.

On system startup, while reset is active, the HPI module will configure the HPI in HOM mode, and load boot code into the SARAM memory. Thus HOM mode accesses must be allowed while reset is active.

In HOM mode, the HPI module has exclusive access to the SARAM. A HOM mode request is initiated by the HPI asserting the chip select signal Acs at 900. This signal is provided by demux block 630. This signal is used to enable the SARAM memory core while request signal Areq is the core strobe signal. The core is accessed on the falling edge of Areq, indicated at 910, for memory reads and writes; thus address bus Aabus, control signals and data input bus Adbusin signals must be valid for a setup time Tsetup before this edge.

As no other module can access the SARAM in HOM mode, the ready signal Aready_out will always be granted at 911 and is simply a buffered version of the Areq input. For a read, the data will be valid after access time Tacc after Aready_out goes active.

Figure 10:
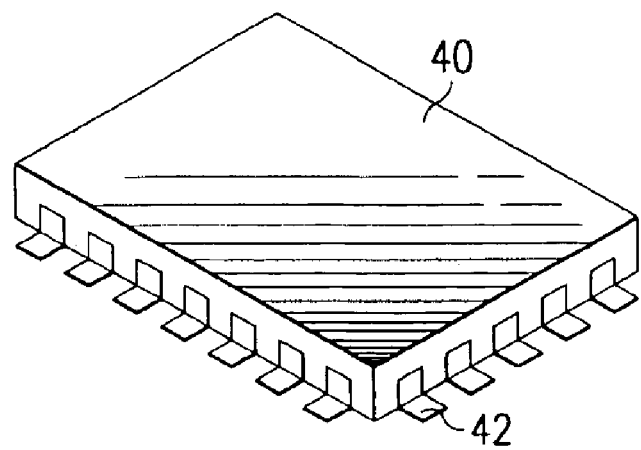
FIG. 10 is a schematic representation of an integrated circuit incorporating the digital system of FIG. 1.

FIG. 10 is a schematic representation of an integrated circuit 40 incorporating processor 100. As shown, the integrated circuit includes a plurality of contacts for surface mounting. However, the integrated circuit could include other configurations, for example a plurality of pins on a lower surface of the circuit for mounting in a zero insertion force socket, or indeed any other suitable configuration.

Figure 11:
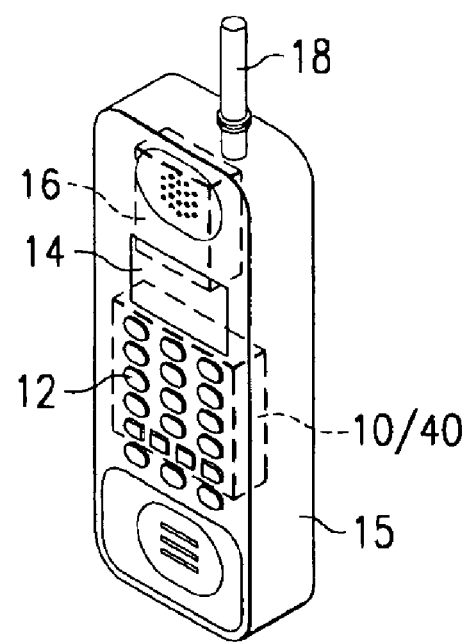
FIG. 11 illustrates an exemplary implementation of an example of such an integrated circuit in a mobile telecommunications device, such as a mobile telephone.

FIG. 11 illustrates an exemplary implementation of an example of such an integrated circuit in a mobile telecommunications device, such as a mobile telephone with integrated keyboard 12 and display 14. As shown in FIG. 11, the digital system 10 included in integrated circuit 40 is connected to the keyboard 12, where appropriate via a keyboard adapter (not shown), to the display 14, where appropriate via a display adapter (not shown) and to radio frequency (RF) circuitry 16. The RF circuitry 16 is connected to an aerial 18.

Fabrication of digital system 10 involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual dice which may be sold as bare die or packaged. After packaging, finished parts are biased into an operational state and tested for operational functionality.

Digital system 10 contains hardware extensions for advanced debugging features. These assist in the development of an application system. Since these capabilities are part of the core of CPU 200 itself, they are available utilizing only the JTAG interface with extended operating mode extensions. They provide simple, inexpensive, and speed independent access to the core for sophisticated debugging and economical system development, without requiring the costly cabling and access to processor pins required by traditional emulator systems or intruding on system resources.

Thus, a digital system is provided with a memory that can be shared by two or more data requesters. Two modes of access are provided. In a host only access mode, a portion of the memory is connected directly to one of the requesters, such as a host processor, so that high bandwidth transfers can be performed. A portion that is not selected to be in HOM can be accessed by other requestors or shut down to save power. The size of the portion of memory selected for HOM mode is selected to match the requirements of a given application and can be changed by writing a size value to a register.

As used herein, the terms "applied," "connected," and "connection" mean electrically connected, including where additional elements may be in the electrical connection path. "Associated" means a controlling relationship, such as a memory resource that is controlled by an associated port.

While the invention has been described with reference to illustrative embodiments, this description is not intended to be construed in a limiting sense. Various other embodiments of the invention will be apparent to persons skilled in the art upon reference to this description. For example, the portion of memory selected for HOM mode may be selected using a finer or courser grain than sixteen banks. The size register may be in the form of a ROM that is electrically alterable or mask programmed, for example. The memory banks may operate in different combinations of sync/async; for example, the memory may operate synchronously to the DSP clock in SAM mode and synchronously to the host processor clock in HOM mode. The HOM selection circuits may be in the form of the SARAM multiplexers or may be tri-stated buses, for example. A different number of channel controllers and/or ports may be implemented. Different types of memory resources may be associated with a port by tailoring the port to match the memory resource.

It is therefore contemplated that the appended claims will cover any such modifications of the embodiments as fall within the true scope and spirit of the invention.

What is claimed is:

1. A digital system, comprising:

a memory circuit;

a first requester circuit with a first memory access node;

a second requester circuit with a second memory access node;

a scheduling circuit connected to the first memory access node and to the second memory access node and having a request output node, operable to sequentially schedule memory accesses to the memory circuit by the first requestor circuit and by the second request circuit;

a selection circuit connected to the first memory access node and to the scheduling circuit request output node with an output node connected to the memory circuit;

access mode circuitry for indicating at least a first access mode and a second access mode controllably connected to the selection circuit, such that both the first requester circuit and the second requestor circuit can sequentially access the memory circuit when the access mode circuitry indicates the first access mode and the first requester circuit has exclusive access to the memory circuit when the access mode circuitry indicates the second access mode; and a size register for holding a size parameter coupled to the selection circuit, the selection circuit being operable to select a first portion of the memory circuit in response to the size parameter when the access mode circuitry indicates the second access mode, wherein only the first portion of the memory circuit is operable for exclusive access by the first requestor when the access mode circuitry indicates the second access mode.

2. The digital system of claim 1, wherein a second portion of the memory circuit not selected in response to the size parameter is operable to be in a low power mode when the access mode circuitry indicates the second access mode.

3. The digital system according to claim 1, wherein the selector circuit is operable such that a second portion of the memory circuit not selected in response to the size parameter can be accessed by the second requester when the access mode circuitry indicates the second access mode.

4. The digital system according to claim 1, wherein the size parameter is ignored when the access mode circuitry indicates the first access mode such that the entire memory circuit is operable to be selected for sequential access by the first requester and the second requestor.

5. A digital system comprising:
   a memory circuit;
   a first requester circuit with a first memory access node;
   a second requestor circuit with a second memory access node;
   a scheduling circuit connected to the first memory access node and to the second memory access node and having a request output node, operable to sequentially schedule memory accesses to the memory circuit by the first requester circuit and by the second request circuit;
   a selection circuit connected to the first memory access node and to the scheduling circuit request output node with an output node connected to the memory circuit;
   access mode circuitry for indicating at least a first access mode and a second access mode controllably connected to the selection circuit, such that both the first requestor circuit and the second requestor circuit can sequentially access the memory circuit when the access mode circuitry indicates the first access mode and the first requester circuit has exclusive access to the memory circuit when the access mode circuitry indicates the second access mode;
   a size register for holding a size parameter coupled to the selection circuit, the selection circuit being operable to select a first portion of the memory circuit in response to the size parameter when the access mode circuitry indicates the second access mode, wherein only the first portion of the memory circuit is operable for exclusive access by the first requester when the access mode circuitry indicates the second access mode; and
   a clock circuit connected to the second requestor and to the memory circuit, wherein the first portion of the memory circuit operates synchronously with the clock circuit when the access mode circuitry indicates the first access mode and wherein the first portion of the memory circuit operates in an asynchronous manner when the access mode circuitry indicates the second access mode.

6. The digital system according to claim 1, wherein the first requester circuit is a host processor and the second requester circuit is direct memory access circuit channel controller.

7. A method of operating a digital system having a memory circuit that is shared by a plurality of requestor circuits, comprising the steps of:
   sharing access to the memory circuit between the plurality of requester circuits when the digital system is in a first mode of operation;
   selecting a first portion of the memory circuit responsive to a size parameter stored in a register, such that a second portion of the memory circuit is not selected; and
   limiting access to the first portion of memory circuit to only a first requestor of the plurality of requestors when the digital system is in a second mode of operation.

8. The method of claim 7, further comprising the step of sharing access to the second portion of the memory circuit between the plurality of requestor circuits when the digital system is in the second mode of operation.

9. The method of claim 7, further comprising the step of placing the second portion of the memory circuit in a low power mode when the digital system is in the second mode of operation.

10. The method of claim 7, wherein the memory has a total size equal to the sum of the first portion and the second portion.

11. The method of claim 10, further comprising the step of storing a different size parameter in the register, such that the step of selecting results in a first portion having a different size in response to the different size parameter.

* * * * *